Jan. 10, 1967 F. A. BREIT ET AL 3,297,827

TRANSFER CIRCUIT

Filed Aug. 26, 1963 2 Sheets-Sheet 1

INVENTORS.
FRANK A. BREIT
THOMAS E. ELLIS
BY
George W. Killian
AGENT

Jan. 10, 1967 F. A. BREIT ETAL 3,297,827

TRANSFER CIRCUIT

Filed Aug. 26, 1963 2 Sheets-Sheet 2

3,297,827
Patented Jan. 10, 1967

3,297,827

TRANSFER CIRCUIT

Frank A. Breit and Thomas E. Ellis, Rochester, N.Y., assignors, by mesne assignments, to Stromberg-Carlson Corporation, Rochester, N.Y., a corporation of Delaware Filed Aug. 26, 1963, Ser. No. 304,333
7 Claims. (Cl. 179—18)

This invention relates in general to automatic telephone systems, and more particularly, to means for extending calls directed to one station to a selected other station.

Although the invention herein disclosed is suitable for more general application, it is particularly adapted for use in automatic telephone systems wherein it is desired that calls directed to one telephone station be extended to some other predetermined telephone station.

Such systems find particular utility in a situation wherein a businessman desires that calls directed to the location of his business be extended to his residence. Therefore, for convenience, the telephone location which controls or initiates the transfer will be referred to as the business phone, or location, while the transferee phone to which the calls are transferred, or extended, will be referred to as the residence phone, or location.

Transfer circuits are transferring calls from a business phone to a residence phone are well known in the prior art. The prior art systems require the operation of a locking key at the business location when the transfer is to be made effective, and the restoration of the key when normal service is to be resumed. In some prior art systems no indication was provided at the business location after the transfer operation and only the residence station was signalled in response to the receipt of calls originally directed to the business station. Other systems provided means for signaling both the business phone and the residence phone when calls were directed to either the business or residence phones. In some of the prior art systems a subscriber at the business phone was permitted to either monitor or join any conversation extended to the residence phone irrespective of whether the call was originally directed to the business or residence station. Systems which provided for signaling both stations did so irrespective of whether the call was originally directed to the business or residence stations. Such systems did not permit restoration of normal service until both the business phone and the residence phone were idle.

It is the general object of this invention to provide a new and improved transfer circuit.

It is another object of this invention to provide a transfer circuit having an improved combination of features.

It is a more particular object of this invention to provide a transfer circuit which has means for restoring the system to normal service irrespective of the busy or idle condition of the transferee station.

It is another object of this invention to provide a transfer circuit which includes means for restoring the transferor station to normal service while calls directed to or from the transferee station are in progress.

It is another object of this invention to provide a transfer circuit which has means for signaling the transferor station as well as the transferee station.

It is another object of this invention to provide a transfer circuit which has means for establishing a conversation between the calling, the transferor station and the transferee station when calls are directed to the transferor station.

It is another object of this invention to provide a transfer circuit which includes means for preventing the signaling of the transferor station when a call is directed to the transferee station.

In accordance with the illustrated embodiment of the present invention there is provided a transfer circuit which is coupled between the business phone and the business phone line circuit. The connector terminals of both the residence phone and the business phone are also connected to the transfer circuit. The business phone is provided with an auxiliary locking switch which grounds the negative, or ring, side of the line. In addition, there are included the usual circuits such as line circuits, line finders, allotters, connectors, and selectors, if required. These circuits are all so well known to those skilled in the electromechanical telephone art that it is believed to be unnecessary to provide detailed descriptions thereof inasmuch as the details of these circuits do not form a part of the present invention.

The transfer circuit includes first and second relays which are associated with the business and residence lines respectively. These relays are arranged in their circuits in such a fashion that both relays operate in response to the direction of a call to the business phone after the operation of the transfer switch. However, only the relay associated with the residence station operates in response to the direction of a call to the residence station. That is, the control, or sleeve leads, of the business and residence phones are not directly multiplied in response to the operation of the transfer switch. A call directed to either station will busy the other station while the transfer switch is operated. The tip and ring leads of the two lines are not multiplied except when a call is actually extended to the residence when it had been originally directed to the business location. By virtue of the arrangement it is possible to signal both locations when calls are directed to the business location, but to signal only the residence location when calls are directed to the residence. Also, this permits the restoration of normal service irrespective of whether the residence phone is engaged in a communication connection directed to or from the residence station. The business phone can never join, or monitor, a call directed to the residence station, but the business phone may join or monitor any conversation that was directed to the business station and extended to the residence.

Further objects and advantages of the invention will become apparent as the following description proceeds, and features of novelty which characterize the invention will be pointed out in particularity in the claims annexed to and forming a part of this specification.

For a better understanding of the invention reference may be had to the accompanying drawings which comprise two figures on two sheets and in which:

FIG. 1 illustrates a block or trunking diagram of a system incorporating the invention; and FIG. 2 shows the details of the transfer circuit of the invention.

It is to be understood that only the details of the circuit necessary to understand the invention have been shown. For example, the connector, line finder, and line circuits that are used may be conventional and similar to any of those which are familiar to one skilled in the electromechanical telephone art. The details of these circuits have not been shown inasmuch as they form no part of the present invention. Also, the system has been shown as a 100-line system having finder-connector links. It is to be understood that any number of selectors could be used between the line finders and connectors for larger systems.

It is believed that the operation of the system incorporating the invention can best be understood by tracing the extension of a call through the system. For this purpose assume that the station designated residence station 102 originates a call. In response to this action a direct current loop will be closed between the conductors designated T(R) and R(R) to the line circuit 120. By means, not shown, the line circuit 120 will provide a signal to initiate the action of line finder 300. The line finder 300, will, in the well-known manner, cause its wipers which are represented symbolically by the single wiper 301, to make contact with the T(R), R(R), and S(R) leads from the line circuit 120. These leads will be extended through the line finder 300 to the connector 400. By means of control apparatus, such as a dial (not shown), at the residence station 102, the connector 400 will be selectively stepped to the terminals associated with the desired called station. For example, if the desired called station is the business station 101, the wipers of the connector 400, represented symbolically by the single wiper 401, will be positioned on the leads designated T(B), R(B), and SN(B). These leads extend to the business line circuit 110 and the transfer circuit 200 to the business phone 101.

The transfer circuit 200 is included to enable the business station 101 to have calls directed thereto extended to the residence station in response to the operation of key 103. It will be noted that the connector terminals of both the business station and the residence station are connected to the transfer circuit 200. Therefore, if a transfer has been requested, as indicated by the operation of transfer key 103, the transfer circuit will, when required, multiple the connector terminals of the business and residence stations.

It is believed that further details of the transfer circuit may more easily be seen from an examination of FIG. 2 taken together with the following detailed description thereof.

DETAILED DESCRIPTION OF TRANSFER CIRCUIT

Figure 1:
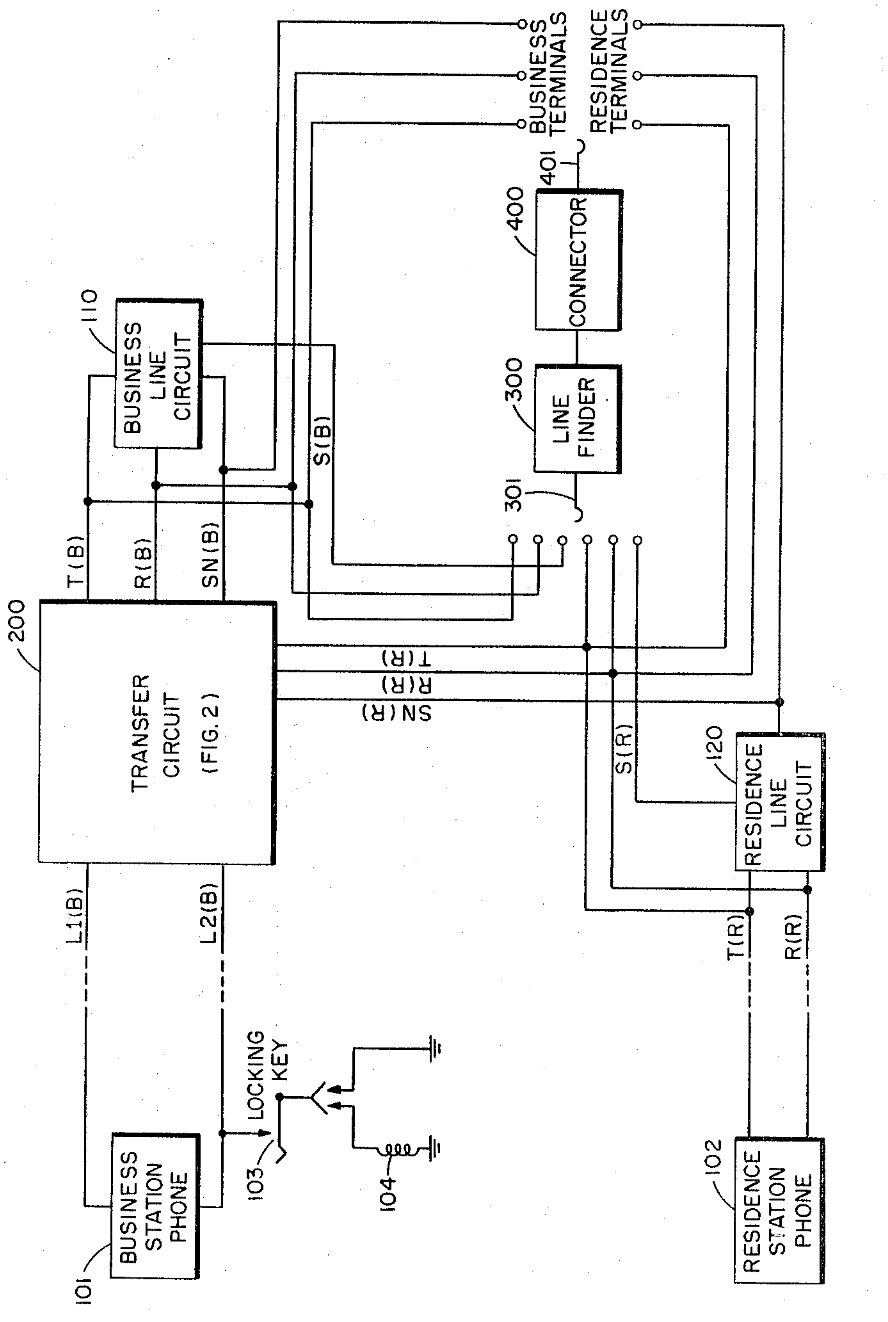

*Business phone originates a call.*—It will be assumed that the transfer switch 103 has not been operated and that a subscriber at the business phone 101 desires to originate a call. In response to the operation of the hookswitch (not shown) at the phone 101, a direct current circuit will be completed between lines L1(B) and L2(B). Current from ground at relay 230 will flow through normally closed contacts 211 and the loop including phone 101 to closed contacts 214 and battery at relay 220. Relays 220 and 230 will operate as a result of the current flowing through this circuit. The closure of contacts 231 will connect resistor 250 across leads T(B) and R(B). The connection of leads T(B) and R(B) through resistor 250 will initiate the standard line circuit and line finder operation. At the completion of the line finder operation a ground will be placed on lead SN(B) by the line finder 300. In response to the ground on lead SN(B) relay 210 will be operated through normal contacts 243 of relay 240. Relay 210 closes its contacts 217 before opening or closing any other contacts and, therefore, relay 210 will lock itself operated to the SN(B) lead. The operation of relay 210 also opens contacts 211 and 214 and closes contacts 212 and 215 with the latter closed before the former opens. The opening of the named contacts will open the circuit to relays 220 and 230. Relay 230 is shunted by a diode which tends to hold relay 230 operated, thereby guaranteeing that relay 220 will release before relay 230. With relay 220 released, a circuit is completed from T(B), contacts 221, 212, the loop including station 101, contacts 215 and 223 to R(B). Therefore, the subscriber's loop is extended to the line circuit and line finder. Subsequently relay 230 releases and opens contacts 231 to open the circuit between leads T(B) and R(B) that had been completed through resistor 250.

The business station is switched through to the connector and may complete a connection to any desired line. In summary, relay 210 is the only relay that remains operated in the transfer circuit 200. Relay 240 did not operate because relay 220 released and opened its contacts 226 before relay 230 released and closed its contacts 233.

*The extension of a call to the business phone when the transfer key is not operated.*—When a call is extended to the business station 101, a ground is placed on lead SN(B). This ground is forwarded through contacts 243 to operate relay 210 which locks itself operated to the operating ground via contacts 217. The operation of relay 210 closes contacts 212 and 215 to switch leads T(B) and R(B) to L1(B) and L2(B), respectively. No other relay operation takes place in the transfer circuit until disconnect, when relay 210 releases.

*Transfer operation.*—When it is desired that calls directed to the business station be extended to the residence station, the key 103 will be operated to apply a ground to the L2(B) lead. The ground may be either a direct ground or a ground through an inductor 104. This key should not be operated while the business phone is engaged in conversation. The ground on lead L2(B) will operate relay 220 which will lock itself operated through contacts 222 to the operating ground. No other circuit operation will occur until an attempt is made by some other station to direct a call to the business station.

*Calls directed to business station while the transfer key is operated.*—When a call is directed to the business station, a ground will be placed on lead SN(B). This ground will be extended through normal contacts 243 to operate battery-connected relay 210. Relay 210 will lock itself operated to the operating ground via contacts 217. The operation of relay 210 will close contacts 218 and forward the operating ground therethrough and through operated contacts 226 and normally closed contacts 233 to operate relay 240. The operation of relay 240 closes contacts 245 to lock relay 240 in parallel with relay 210 through contacts 218. The closure of contacts 244 connects the SN(B) and the SN(R) leads together to busy the residence connector terminal. The connector 400 will apply a ringing signal to lead T(B) and the signal will be extended through capacitor 260 and contacts 212 to the business station. In addition, the ringing signal will be extended through operated contacts 241 and 213 to the T(R) lead to signal the residence station.

When the call is answered at the residence, the ringing will be tripped in the normal manner without affecting any of the relays in the transfer circuit 200. Removal of the handset at the business station 101 will not trip the ringing because capacitor 260 blocks the flow of direct current.

In summary, when the transfer key 103 is operated relay 220 will operate and, when a call is directed to the business station, relays 210 and 240 will operate in that order. The connector terminal of the residence station will be marked busy.

As pointed out, the business phone will ring whenever calls are directed to the business station even after the transfer key has been operated. This guards against loss of service due to failure to restore key 103 when the businessman returns to the business site. Calls cannot be answered at the business station until the transfer key is restored since the R(B) lead does not extend into business station 101.

*Calls directed to or from the residence station while the transfer key is operated.*—As described above, operation of the transfer key 103 will result in the operation of relay 220. Thereafter, if a call is directed to or from the residence station, a ground will be placed upon the SN(R) lead. This ground will be passed through normal contacts 232, operated contacts 224 and 226, and normal contacts 233 to operate relay 240. The operation of relay 240 will close contacts 244 to connect lead SN(B) to SN(R) thereby busying out the business station connector terminals. That is, since calls directed to the business station are to be answered at the residence station, the business station must be marked as busy whenever the residence station is busy and, therefore unable to answer calls directed to the business station. On a call directed to the residence station 102 a ringing signal is not transmitted to the business station as relay 210 is not operated to multiple the business and the residence T and R leads.

In summary, when the transfer key is operated, relays 220 and 240 are operated when a call is directed to the residence station.

*Restoration of normal service.*—Upon returning to the business site, the businessman should restore the transfer key 103 and pick up his handset to determine if a call is in progress. Three different conditions may exist at the time the transfer key is restored:

(1) No call is in progress that was directed to either the business station or the residence station.

(2) A call is in progress that was directed to the business station but extended to the residence station.

(3) A call is in progress that was directed to or from the residence station.

In the first case the only relay operated is relay 220. Upon restoration of the key 103 relay 220 will be released and when the handset is picked up to check for the possible presence of a call in progress, the businessman will hear dial tone which indicates that no call is in progress and his line is free to originate calls, or to receive calls after he hangs up.

In the second case, relays 220, 210 and 240 are all operated. Restoration of key 103 will release relay 220 but relays 210 and 240 both remain locked to the ground on the SN(B) lead. With relays 210 and 240 operated, the L1(B) and L2(B) leads are connected to leads T(R) and R(R), respectively, thereby connecting the business station into the talking circuit and permitting a three-way conversation between the calling party, the business station, and the residence station. If desired, the residence station may disconnect and the business station and the calling party may continue the conversation. Release by the calling party removes ground from the SN(B) lead thereby releasing relays 210 and 240 and restoring the transfer circuit to normal with all relays released.

In the third case, relays 220 and 240 are operated. Restoration of key 103 will release relay 220. The release of relay 220 opens contacts 224 which were included in the circuit to hold relay 240. Accordingly, relay 240 will release. The release of relay 240 opens contacts 244, thereby opening the circuit between SN(R) and SN(B) to remove the busy marking from the business station connector terminals and to allow the extension of calls to or from the business station. When the handset is picked up at the business station, dial tone will be heard indicating the line is free. The conversation in progress at the residence station will not be interrupted by the restoration of key 103. It should be noted that the business station cannot monitor or join a conversation directed to or from the residence station, and that the business station is free to originate or receive calls as soon as key 103 is restored.

*Monitoring calls.*—Calls directed to the business station 101 and extended by the transfer circuit 200 to the residence circuit 102 may be monitored at the business station. That is, the businessman at the business location may listen to such calls without being heard. The monitoring may be accomplished by raising the handset without restoring key 103. If, after monitoring, the businessman desires to joint the conversation, as a third party, he may do so by restoring the key 103.

Figure 2:
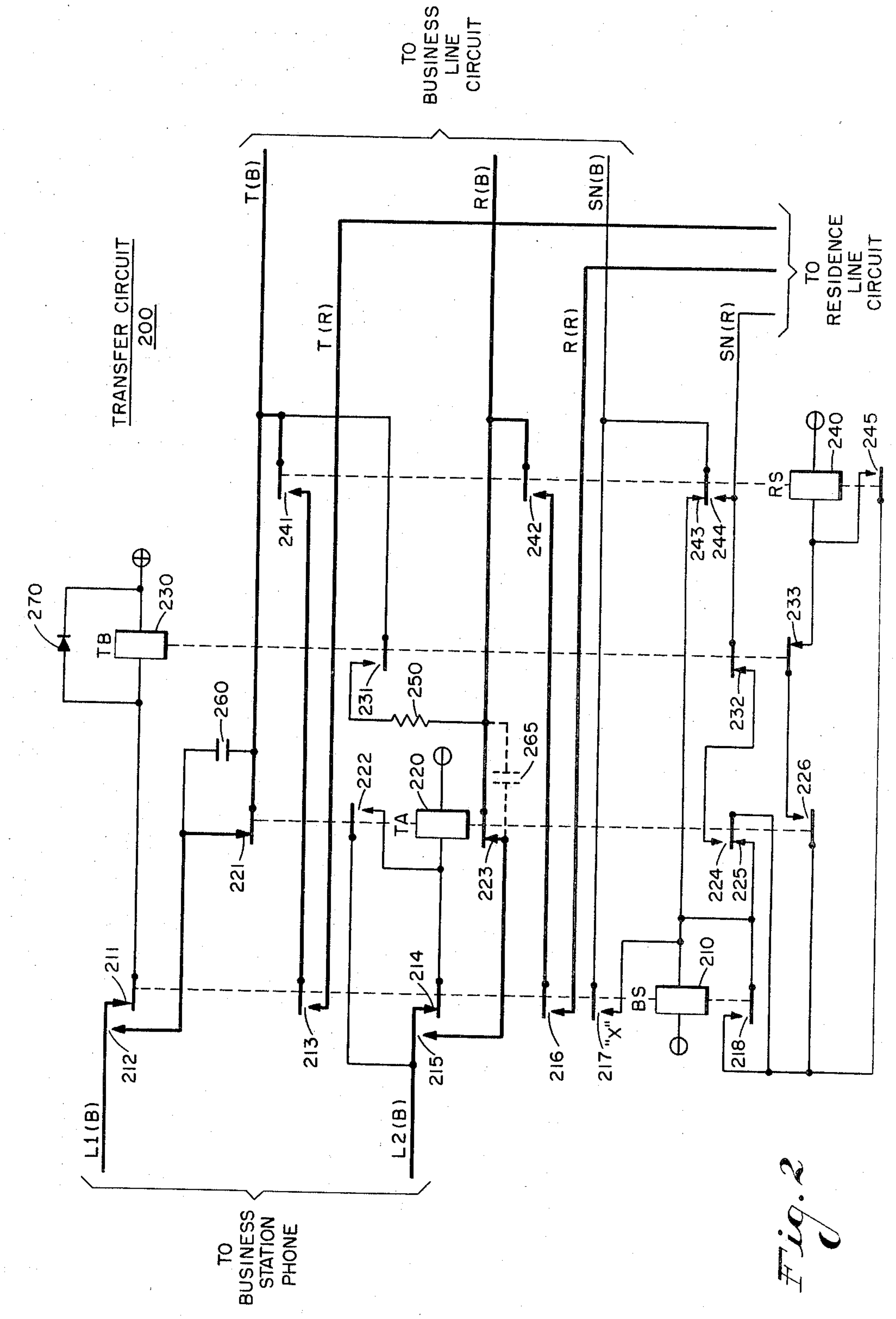

The monitoring feature may be added by the addition of capacitor 265 as shown in FIG. 2. Capacitor 265 would be matched to capacitor 260 and the conversation signals will be passed from the T(R) and R(R) leads to the L1(B) and L2(B) leads through capacitors 260 and 265. The capacitors block the flow of direct current thereby rendering the transmitter at the business phone ineffective. The inductor 104 is used to provide a high impedance between the L2(B) conductor and ground to avoid unbalancing the line during monitoring.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In an electromechanical telephone system, a central office, a plurality of subscribers' lines including first and second subscribers' lines connected to said central office, switching circuits controlled by a calling one of said lines including said first and second lines for selectively signaling any one or said other lines and for completing a communication connection between said calling line and said other line, a transfer circuit coupled to said first and second lines and said switching circuits, first and second stations coupled to said first and second lines, respectively, at the ends thereof remote from said central office, control means at said first station for extending a marking signal to said transfer circuit, said transfer circuit including means for extending any signal directed to said first line to both said first and second lines and for restricting any signal directed to said second line from being extended to said first line while said marking signal is extended to said transfer circuit.

2. The combination as set forth in claim 1 wherein said transfer means includes means responsive to said control means for forwarding answer supervision from either of said first or second stations to said switching circuits when both said first and second lines are signaled in response to a signal directed to said first line.

3. The combination as set forth in claim 2 wherein means are included in said transfer circuit for extending a signal to said first line while a communication connection directed to said second line is in progress and said marking signal is extended to said transfer circuit when the connection to said second line is completed but wherein said marking signal is not extended to said transfer circuit when the signal is extended to said first line.

4. In an electromechanical telephone system, a central office, a plurality of subscribers' lines including first and second subscribers' lines connected to said central office, switching circuits including a line circuit associated with each of said subscribers' lines for completing a communication connection between a calling one and a selected called one of said lines, a transfer circuit connected between said first line and the line circuit associated with said first line, connecting means for connecting the line circuit associated with said second line to said transfer circuit, control means connected to said first line for selectively switching said transfer circuit to first and second conditions, said transfer circuit including extending means for extending a communication connection directed to either said first or second line to said second line when said transfer circuit is set to said second condition and for extending a communication connection to the directed one of said first and second lines when said transfer circuit is set to said first condition, and said transfer circuit including means operative conjointly with said extending means for extending signaling signals to both of said first and second lines when a communication connection is directed to said first line and said transfer circuit it set to said second condition and for extending said signaling signals to said second line only when a communication connection is directed to said second line and said transfer circuit is set to said second combination.

5. The combination as set forth in claim 4 and including means in said transfer circuit for restoring said transfer circuit from said second condition to said first condition in response to a signal from said control means irrespective of whether or not a communication connection directed to or from said second line is in progress.

6. The combination as set forth in claim 5 wherein said transfer circuit includes monitor means for enabling said first line to monitor any communication connection directed to said first line and extended to said second line when said transfer circuit is set to said second condition.

7. The combination as set forth in claim 6 wherein communication connections directed to said first line and extended to said second line may also be extended to said first line in response to a signal from said control means.

References Cited by the Examiner

UNITED STATES PATENTS

| | | | |
|---|---|---|---|
| 2,095,712 | 10/1937 | Peterson | 179—18.03 |
| 2,312,385 | 3/1943 | Burgener | 179—27.25 |

KATHLEEN H. CLAFFY, *Primary Examiner.*

WILLIAM C. COOPER, *Examiner.*